United States Patent [19]
Theis

[11] Patent Number: 5,315,688
[45] Date of Patent: May 24, 1994

[54] SYSTEM FOR RECOGNIZING OR COUNTING SPOKEN ITEMIZED EXPRESSIONS

[76] Inventor: Peter F. Theis, 3203 Bay View La., McHenry, Ill. 60050

[21] Appl. No.: 643,047

[22] Filed: Jan. 18, 1991

Related U.S. Application Data

[63] Continuation-in-part of Ser. No. 586,089, Sep. 21, 1990, Pat. No. 5,201,028.

[51] Int. Cl.[5] .............................................. G10L 9/02
[52] U.S. Cl. ................................. 395/2.42; 395/2.62
[58] Field of Search ................................. 381/29–46; 395/2.42, 2.62

[56] References Cited

U.S. PATENT DOCUMENTS

| Re. 32,172 | 6/1986 | Johnston et al. | 381/46 |
|---|---|---|---|
| 3,582,559 | 6/1971 | Hitchcock | 179/15 B |
| 3,742,143 | 6/1973 | Awipi | 381/41 |
| 3,821,472 | 6/1974 | Herscher et al. | 179/SA |
| 3,864,519 | 2/1975 | Owen | 179/1 VC |
| 3,940,565 | 1/1976 | Lindenberg | 179/1 SA |
| 4,004,101 | 1/1977 | Vaillant | 179/15 AS |
| 4,539,436 | 9/1985 | Theis | 179/6.04 |
| 4,542,525 | 9/1985 | Hopf | 381/56 |
| 4,559,416 | 12/1985 | Theis et al. | 179/7.1 R |
| 4,593,157 | 6/1986 | Usdan | 179/90 BD |
| 4,692,817 | 9/1987 | Their | 360/12 |
| 4,852,170 | 7/1989 | Bordeaux | 381/43 |
| 4,870,686 | 9/1989 | Gerson et al. | 381/43 |
| 4,918,730 | 4/1990 | Schulze | 381/43 |
| 5,058,168 | 10/1991 | Koyama | 381/46 |

FOREIGN PATENT DOCUMENTS 1172946 12/1969 United Kingdom .
1238113 7/1971 United Kingdom .

OTHER PUBLICATIONS

Oct. 16, 1991 International Search Report Re: Appln. Ser. No. PCT/US91/06845.
Nov. 20, 1991 British Examiner's Report to the Comptroller under Sec. 17 Re: Appln. Ser. No. 911841.6.

Primary Examiner—Michael R. Fleming
Assistant Examiner—Michelle Doerrler
Attorney, Agent, or Firm—Conley, Rose & Tayon

[57] ABSTRACT

A speech categorization system includes first and second timers which generate first and second measured durations indicative of duration of selected higher and lower amplitude segments included in a voice message. A higher amplitude segment is classified in a first category when the first and second measured durations corresponding to the higher amplitude segment and an adjacent lower amplitude segment satisfy a classification test, and a counter counts the number of the higher amplitude segments classified in the first category Accented syllables in the higher amplitude segment are recognized to aid classification.

25 Claims, 10 Drawing Sheets

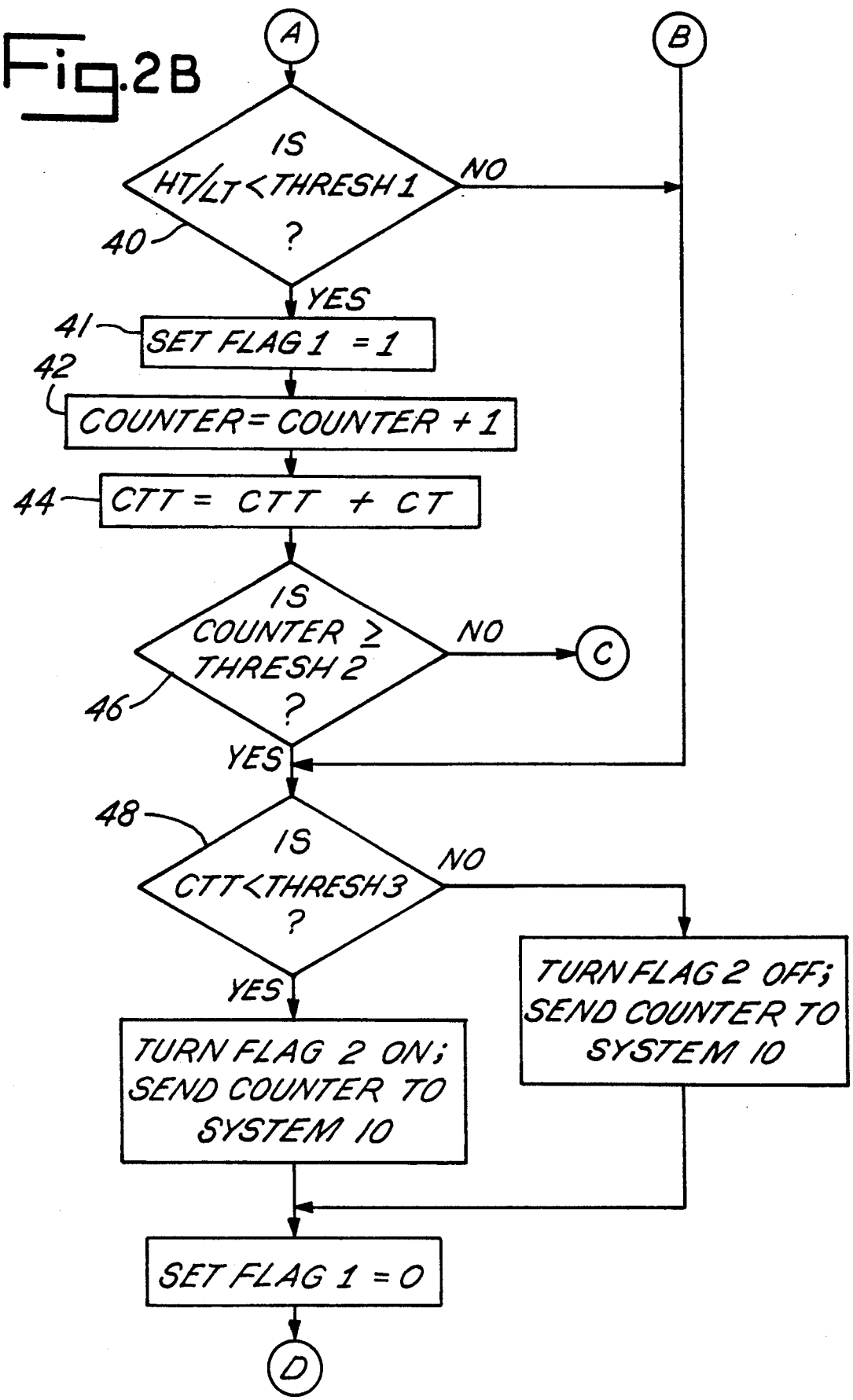

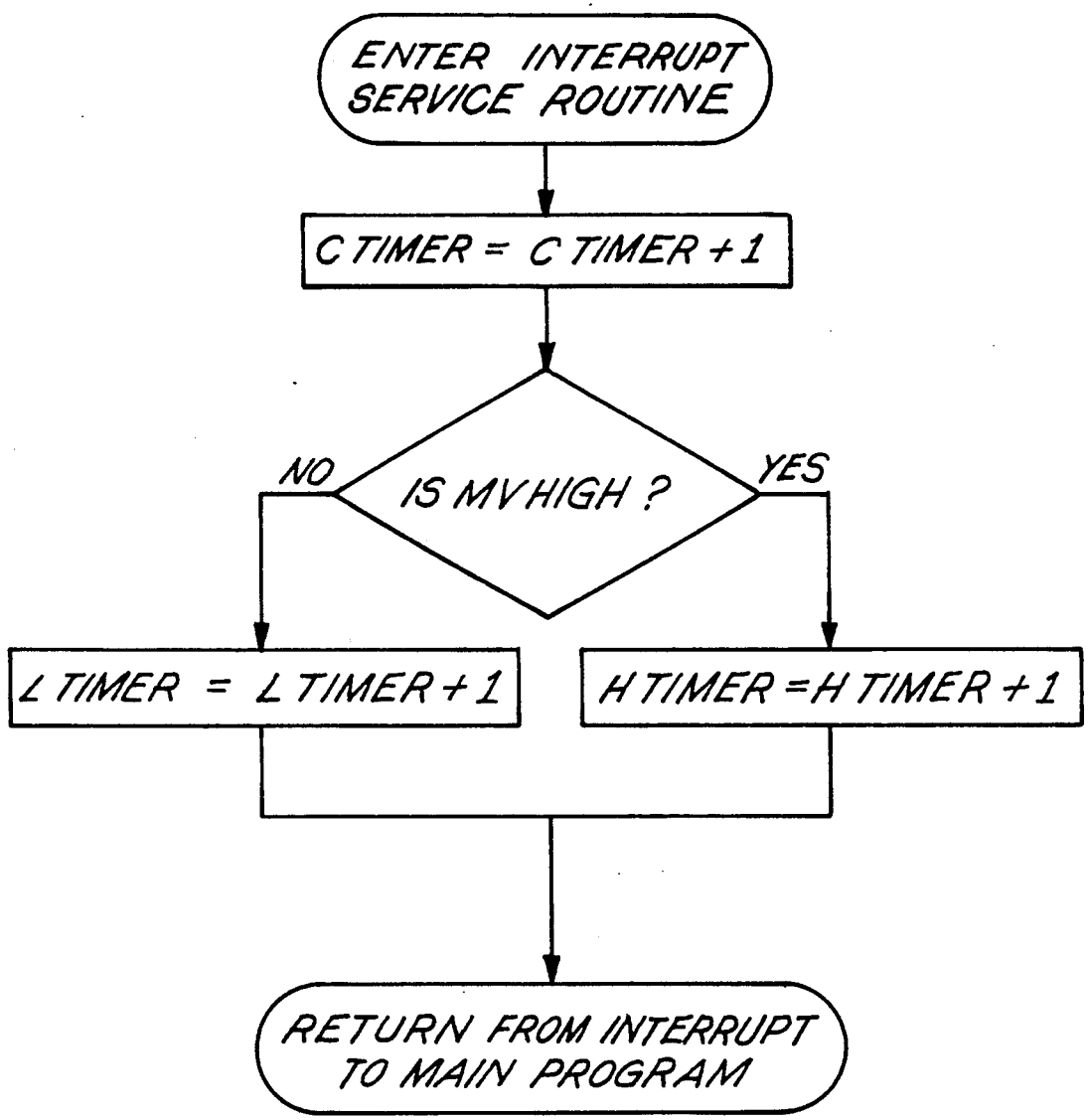

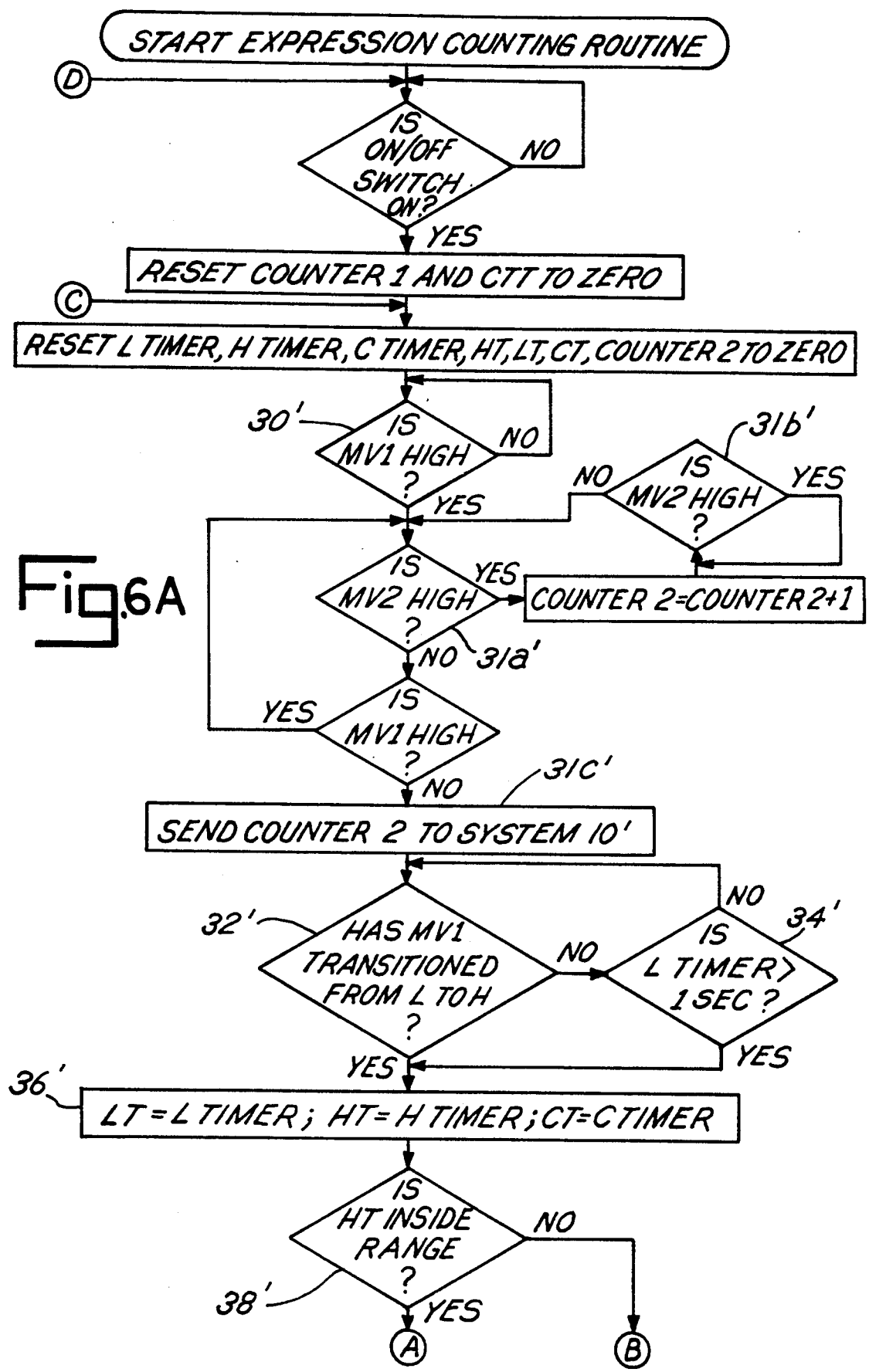

SYSTEM FOR RECOGNIZING OR COUNTING SPOKEN ITEMIZED EXPRESSIONS

CROSS REFERENCE TO RELATED APPLICATION

This application is a continuation in part of copending U.S. patent application Ser. No. 07/586,089, filed Sep. 21, 1990 now U.S. Pat. No. 5,201,028.

BACKGROUND OF THE INVENTION

This invention relates to a system for distinguishing or counting spoken itemized expressions without relying on conventional word recognition devices. It is particularly suitable for use in combination with programmed conversation recording systems.

Programmed conversation recording systems of the type described in my previous U.S. Pat. No. 4,539,436 can be used to conduct a simulated conversation with a speaker by alternately presenting the speaker with messages, and then recording spoken responses. Such programmed conversations are preferably sequenced by waiting for a pause in the spoken response to indicate that the response has been completed. By way of example, the recording system may wait for a pause of two seconds in a response before presenting a next message to the speaker.

A programmed conversation recording system can also be designed to wait for a pause to indicate that the speaker has completed his response, and then to gauge the duration of the response to determine the nature of the response. For example, a short response to the prompt "Are you calling to place an order?", can be taken as indicative of a positive answer, whereas a longer response can be taken as indicative of a negative answer. ("No, I am calling about my bill.") Note the related discussion in my previous U.S. Pat. No. 4,692,817.

Another approach to controlling a programmed conversation employs word recognition devices for specific words to recognize these words in the response. Thus, the recognition of seven or ten specific digits in the response to the prompt "May I have your phone number?" can be indicative of a complete response. However, the technology to recognize spoken digits, particularly, over the telephone, is not suitable for many applications either due to high cost or insufficient reliability of such recognition systems.

It is a primary object of this invention to provide a system which distinguishes spoken itemized expressions such as words, characters, numbers and strings of words from spoken continuous speech, without relying on state of the art word recognition devices.

It is another object to provide a system which counts spoken itemized expressions such as words, characters, numbers, and strings of words.

It is another object to identify the beginning and end of a string of spoken itemized expressions.

It is another object to identify the lack of a string of spoken itemized expressions.

It is another object to measure separately the duration of higher amplitude and subsequent lower amplitude portions of a voice message, and to use these measured durations in order to characterize the nature, content, or duration of the expression.

It is another object to recognize and/or count the number of accented syllables within a voiced message as an aid to classification.

SUMMARY OF THE INVENTION

According to one aspect of this invention, a method is provided for distinguishing a spoken itemized expression from continuous speech. At least one higher amplitude segment and at least one adjacent and subsequent lower amplitude segment are identified in a spoken passage, and the duration of each is measured. The higher amplitude segment is recognized as a spoken itemized expression when the duration of the higher amplitude segment is less than a threshold value, which may be set with respect to the duration of the adjacent lower amplitude segment or alternatively as a range of values which are independent of the duration of adjacent segments. Accented portions of the higher amplitude segments are recognized when present. This aspect of the invention may be used to detect either the presence or the absence of spoken itemized expressions.

This method can be used to distinguish spoken itemized expressions such as voiced numbers in a zip code or a telephone number, voiced letters in a spelled name, or voiced elements of longer duration, and to distinguish such spoken itemized expressions from continuous speech. If desired, the higher amplitude segments recognized as spoken itemized expressions can be counted, as can the number of accented portions within a higher amplitude segment. For example, this approach can be used in conjunction with a programmed conversation recording system, where the course of the programmed conversation may branch in accordance with the number of digits spoken in response to the prompt "May I have your telephone number?".

According to another aspect of this invention, a voice categorization system is provided for use with a voice message of the type having at least one higher amplitude segment adjacent to at least one lower amplitude segment, wherein the higher amplitude segments are indicative of voiced sounds, and wherein the lower amplitude segments are indicative of periods of relative silence between adjacent voice sounds. This system includes first and second timers operative to generate first and second measured durations indicative of duration of selected higher and lower amplitude segments, respectively. Means are provided for classifying a higher amplitude segment in a first category when the first and second measured durations corresponding to the higher amplitude segment and an adjacent lower amplitude segment satisfy a classification test, and a counter counts the number of higher amplitude segments classified in the first category. Means are provided for recognizing an accented portion of the higher amplitude segment.

According to a third aspect of this invention, a voice categorization system for categorizing voice messages as described above includes means for developing a classification parameter indicative of relative duration of at least one of the higher amplitude segments with respect to an adjacent lower amplitude segment. Means are provided for classifying the higher amplitude segments into at least two categories, wherein one of the categories is indicative of a spoken itemized expression. This classifying means applies at least one classification test which places one of the higher amplitude segments in a first category when the respective classification parameter is greater than a threshold value, and in a second category when the respective classification parameter is less than the threshold value. The higher amplitude segments in one of the two categories are then counted to categorize the voice message. Means are provided for recognizing an accented portion of the higher amplitude segment when present.

It has been discovered that when expressions such as words, characters, numbers, and strings of words are itemized by a speaker, the duration of the pause after each itemized expression is relatively long with respect to the duration of the envelope for the expression. Furthermore, when itemizing such expressions, a speaker will typically create a rhythm. This rhythm is distinguishable because the pause after the envelope for each itemized expression will be relatively uniform in duration. In contrast, when a speaker is not itemizing expressions, he is either silent, or he generates a continuous envelope of long duration that is significantly longer than the pause between envelopes.

This discovery can be used as described below to count the number of spoken itemized expressions included in a spoken response. For example, the number of spoken itemized expressions in a speaker's response can be counted, and this number can then be used by a programmed conversation recording system to control the conversation. For example, if the prompt given to a speaker were "May I have your phone number?", a typical response may be either a ten digit number (telephone number with area code) or a seven digit number (telephone number without area code). In the first case, the programmed conversation can branch to a prompt that requests an address, while in the second case the conversation can branch to a prompt that asks for the area code. In this way, the programmed conversation can be designed to accommodate different types of responses flexibly. Counting the number of accented portions of a response segment allows more accurate classification of itemized expressions.

The invention itself, together with further objects and attendant advantages, will best be understood by reference to the following detailed description, taken in conjunction with the accompanying drawings.

DETAILED DESCRIPTION OF THE DRAWINGS

FIG. 1 is a block diagram of a programmed conversation recording system which includes a first preferred embodiment.

FIGS. 2a and 2b together constitute a flow chart of the character counting routine of FIG. 1.

FIG. 3 is a flow chart of the interrupt service routine of FIG. 1.

Figure 5:
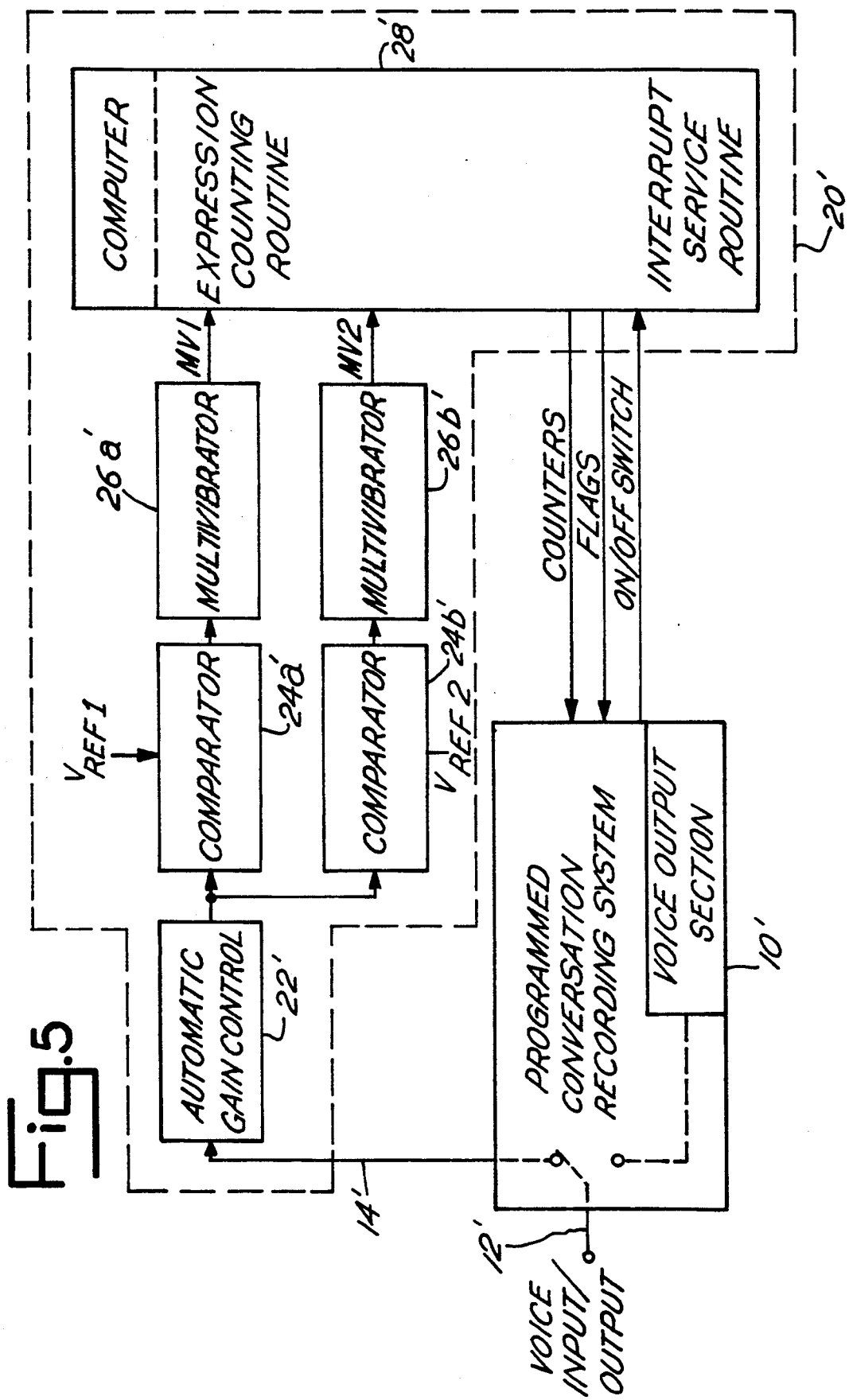
FIG. 5 is a block diagram of a programmed recording system which includes a second preferred embodiment.
Figure 6B:
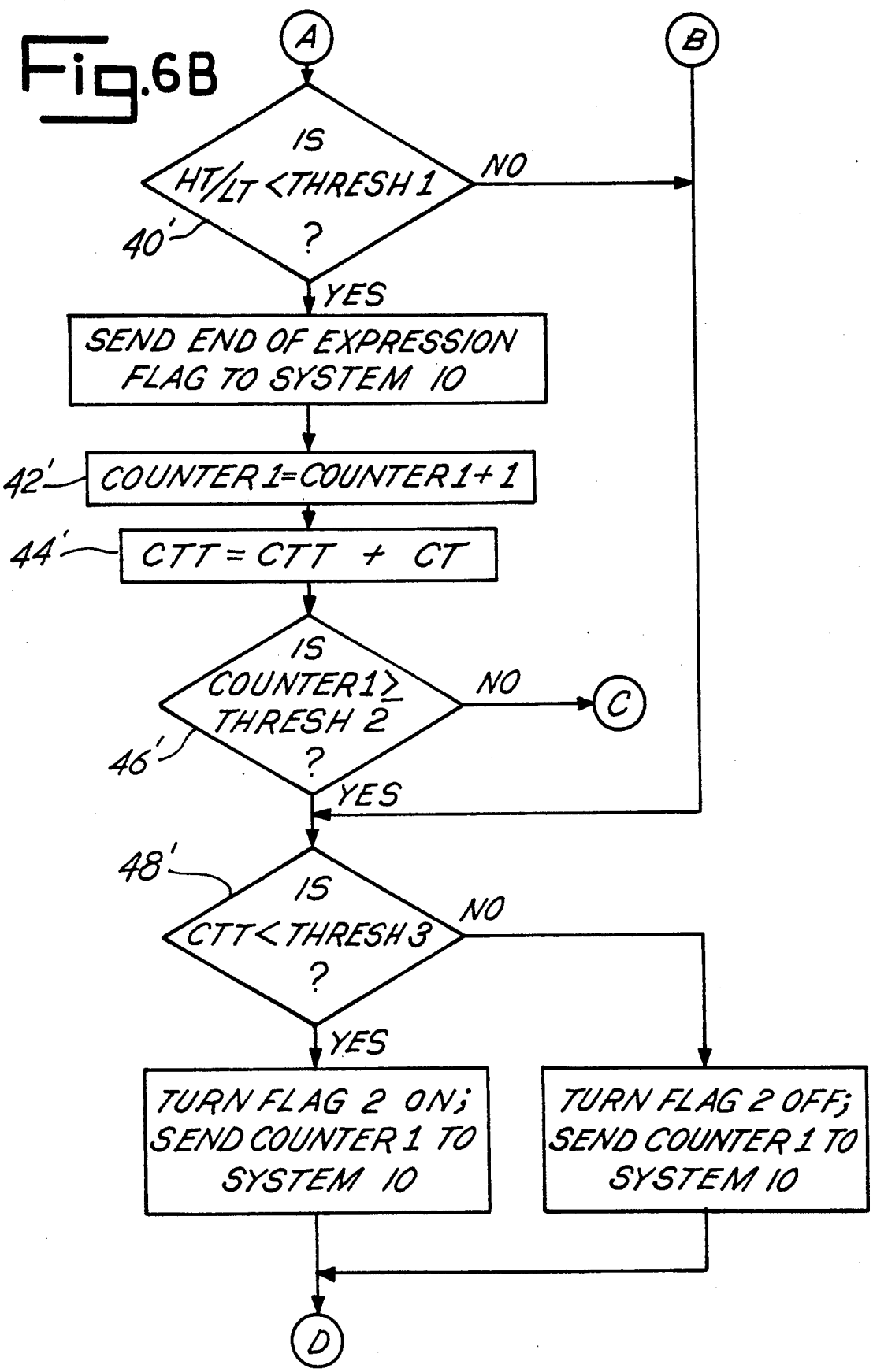

FIGS. 6a and 6b together constitute a flow chart of the expression counting routine of FIG. 5.

Figure 7:
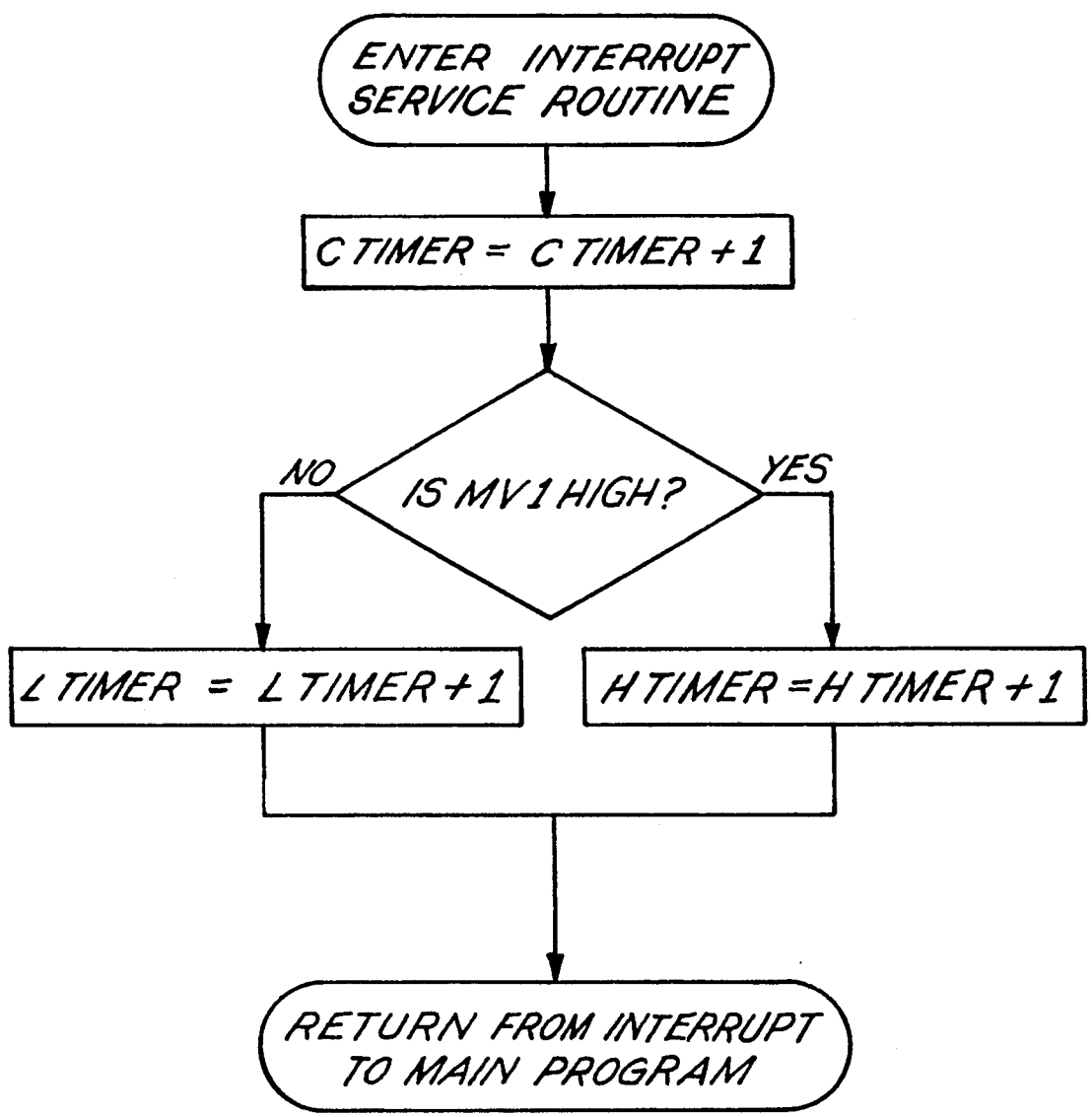

FIG. 7 is a flow chart of the interrupt service routine of FIG. 5.

Figure 8A:
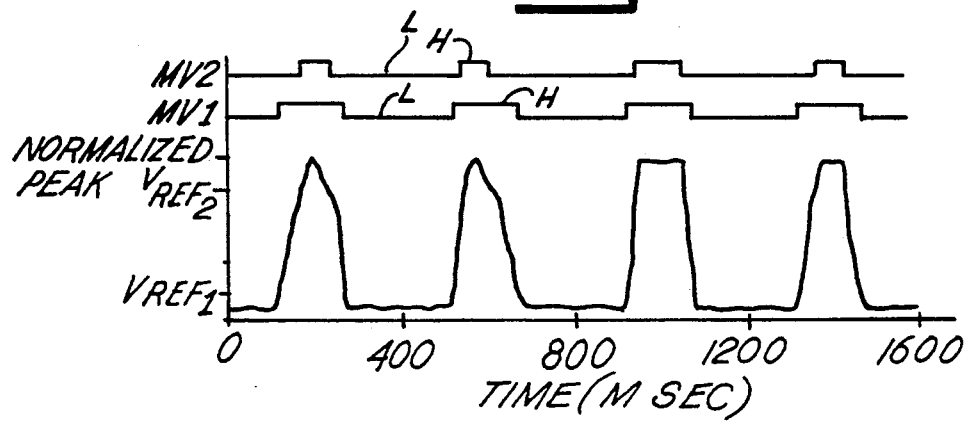
Figure 8B:
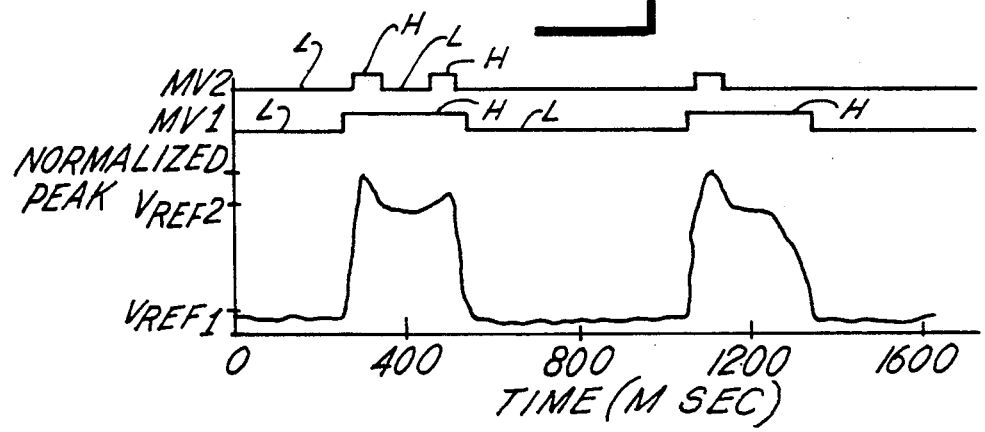
Figure 8C:
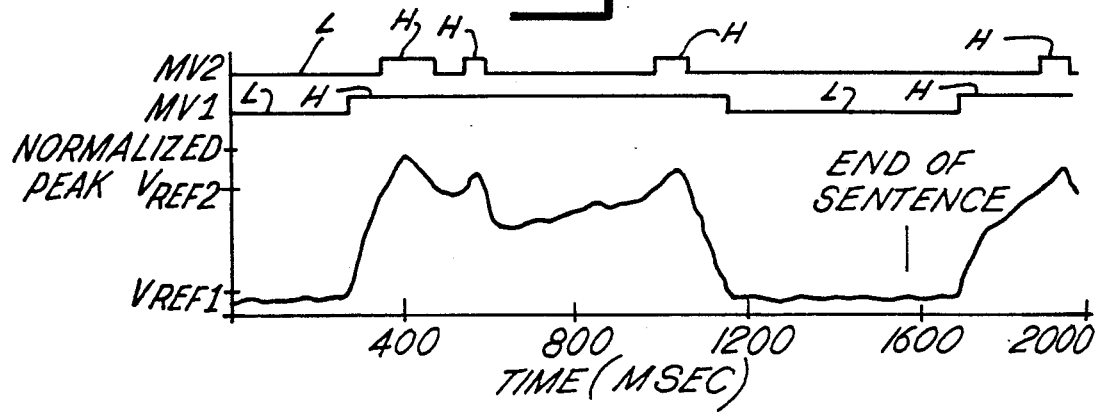

FIGS. 8a–8c are waveform diagrams of portions of typical speech patterns for voiced characters (FIG. 8a), voiced paired characters (FIGS. 8b), and a voiced sentence (FIG. 8c).

DETAILED DESCRIPTION OF THE PRESENTLY PREFERRED EMBODIMENTS

First Preferred Embodiment

Figure 1:
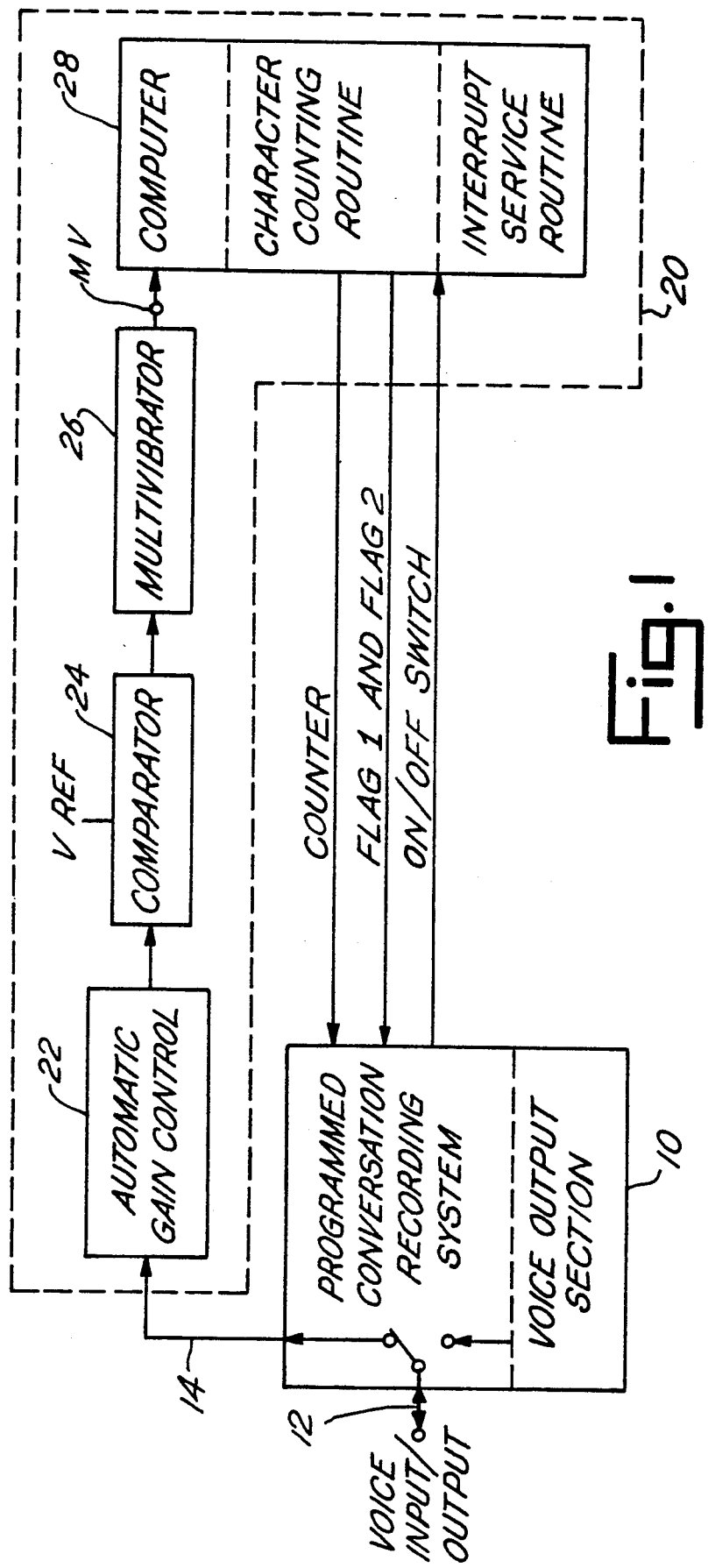

FIG. 1 shows a block diagram of a programmed conversation recording system 10 which is connected to a combination voice input and voice output 12. The programmed conversation recording system 10 does not per se form part of this invention and can be constructed as described for example, in my previous U.S. Pat. Nos. 4,539,436 or 4,692,817. In general, the programmed conversation recording system 10 monitors responses of a user such as a caller appearing at the voice input/output 12 and presents messages to the user or caller at the voice input/output 12. The voice input/output 12 may be connected to a telephone line when desired. However, it is not essential in all applications that the programmed conversation recording system 10 be used in conjunction with a telephone network, and alternate arrangements including radio links or hard wired links are possible.

In this embodiment, the programmed conversation recording system 10 simulates a conversation by presenting the speaker with messages which are typically questions, and by recording the speaker's responses to these messages. As pointed out below, the system 10 may alter the course of the programmed conversation depending upon the content of the speaker's response, as determined by the categorization system 20. The system 10 monitors the input/output 12 and automatically switches voice responses from a user to a line 14.

The categorization system 20 includes an automatic gain control circuit 22 which receives spoken responses appearing at the line 14. The automatic gain control circuit 22 amplifies the spoken response by an amount so the peak output of a set of spoken responses equals a pre-established level. One suitable device is disclosed in U.S. Pat. No. 4,112,384 "Controlled Recovery Automatic Gain Control Amplifier", but other commercially available automatic gain control circuits are also suitable, including those that normalize average or minimum signal level.

The amplified spoken response generated by the automatic gain control circuit 22 is applied as an input to a comparator 24 which compares the amplified spoken response with a threshold voltage $V_{ref}$. This threshold voltage is set to distinguish voiced speech from background voice, noise, and distant voice or whispers. Preferably, the threshold voltage is adjustable depending upon the accuracy needed. A higher level for $V_{ref}$ is more certain to detect only the desired voiced expressions, but may miss some spoken itemized expressions, particularly the second syllable of a two digit number, whereas a lower value for $V_{ref}$ may detect undesirable speech, but has a lower likelihood of missing spoken itemized expressions. A slightly more complex arrangement would be to provide two threshold levels, one to detect peak speech, and a second to separate softer speech from a pause in speech. This approach would slightly increase the complexity of subsequent digital processing, but it would simplify proper adjustment of the threshold values.

The output of the comparator 24 is a two state binary signal indicative of whether the output of the automatic gain control circuit 22 is greater or less than $V_{ref}$. This output signal is used to trigger a monostable multivibrator 26. The multivibrator 26 generates an output signal MV which is placed in the logic high state whenever the multivibrator 26 is triggered by the comparator 24, and which remains in the high state for a brief period of time such as ten milliseconds, unless retriggered while in the high state. This binary signal MV is applied as an input to a computer 28 that executes the routines flow charted in FIGS. 2a, 2b and 3.

In the following discussion, periods of time in which the signal MV is in the logic high state will on occasion be referred to as higher amplitude segments. Similarly, when the multivibrator 26 has not been triggered in the last ten milliseconds by the comparator 24, the signal MV is in the logic low state, indicative of a lower amplitude segment.

Figure 2A:
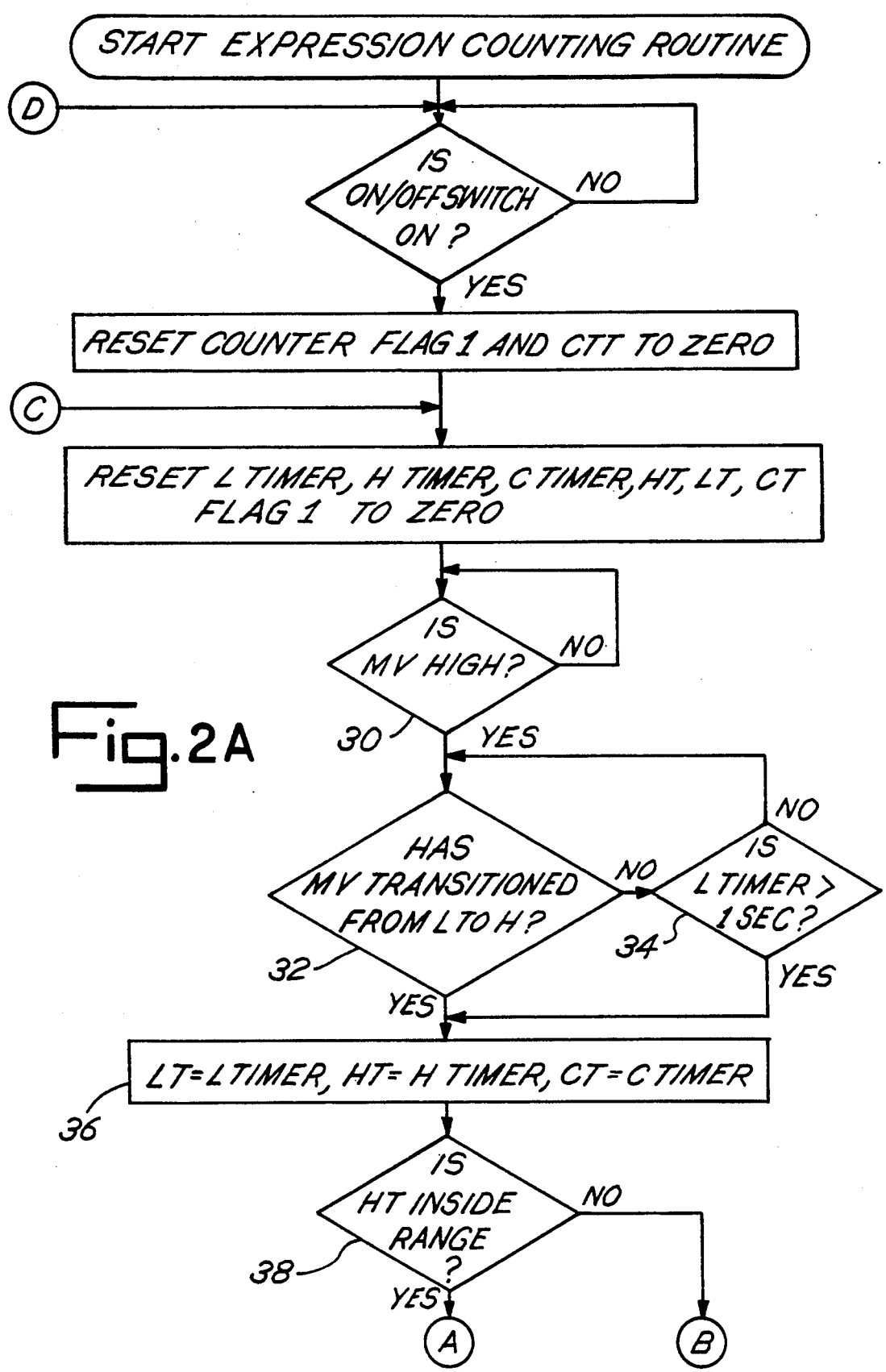

The signal MV is used by the expression counting routine flow charted in FIGS. 2a and 2b to detect the pattern of higher amplitude segments and lower amplitude segments indicative of spoken itemized expressions and to count such expressions. Counted expressions are transmitted back to the programmed conversation recording system 10 by the variable COUNTER, along with the variables FLAG 1 (indicative of whether a voiced response is recognized and counted as an itemized expression or not) and FLAG 2 (indicative of whether the counting process exceeded a maximum counting interval). Also, as shown in FIG. 1, the system 10 controls a on/off switch that supplies a signal to the computer 28 to enable or disable the character counting routine.

Figure 4A:
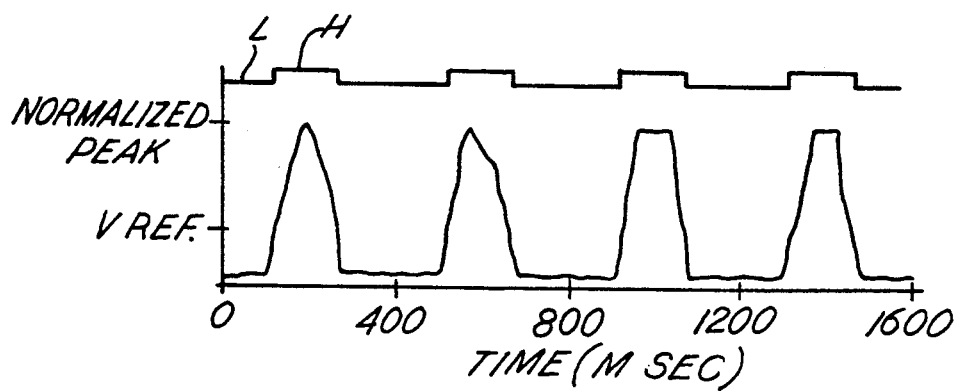
FIGS. 4a through 4c are waveform diagrams of portions of typical speech patterns for voiced characters (FIG. 4a), voiced paired characters (FIG. 4b), and a voiced sentence (FIG. 4c).
Figure 4B:
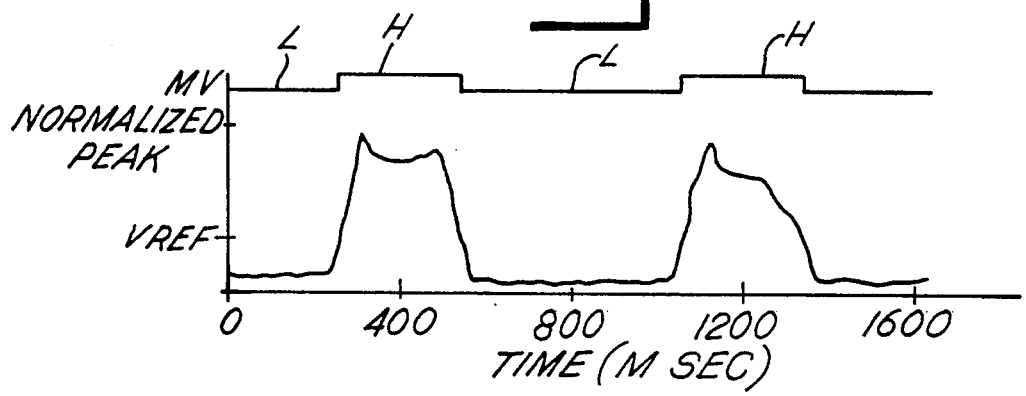
Figure 4C:
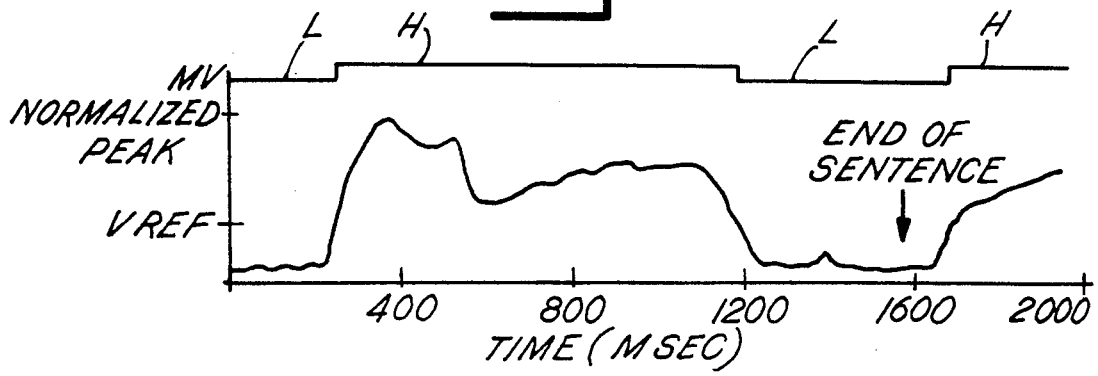

Before proceeding to a discussion of the character counting routine, FIGS. 4a through 4c illustrate characteristics of spoken itemized expressions which are important in the operation of this routine.

FIG. 4a shows a series of waveforms representative of the positive side of the envelope of a series of spoken itemized expressions such as characters, as they appear at the output of the automatic gain control circuit 22. Note that the duration of the cycle of a voiced character and the subsequent period of silence is about 400 ms. Of this cycle, the voiced portion is relatively shorter than the silence portion. The pattern of FIG. 4a is characteristic of four voiced numbers, four voiced alphabetics, or four voiced short words. As used herein, the term "expressions" will be used to encompass characters (both numerics and alphabetics), words, and brief multiword expressions.

FIG. 4b shows numbers voiced as two number sets (such as "25"). Note that the cycle of time of a voiced sound and the adjacent period of silence is approximately twice as long as when a single character is spoken (FIG. 4a). However, the voiced portion is still substantially shorter than the silence portion. Note also that the trailing half of the voiced portion is lower than the leading edge, but is still significant in amplitude.

FIG. 4c shows waveforms typical of continuous voice such as is encountered in a spoken sentence that lacks itemized expressions. Note that the gaps between words and syllables of the sentence are virtually nonexistent. Thus the phrase "I would like to speak to an operator" will often appear as a full second of voiced sound. There will be a pause before the next sentence but, unlike the situation described above in conjunction with itemized words such as characters, the duration of a pause before a second sentence will typically be short compared with the preceding speech portion.

FIGS. 4a through 4c show the normalized peak as determined by the automatic gain control 22, along with the threshold $V_{ref}$. The horizontal axis is measured in milliseconds. Also, FIGS. 4a through 4c show the signal MV as generated by the multivibrator 26. In the illustrated waveform for MV, higher amplitude segments are indicated with the reference symbol H and lower amplitude segments with the reference symbol L. As shown in FIGS. 4a through 4c, the ratio of the duration of a higher amplitude segment H to the duration of the subsequent lower amplitude segment L is indicative of the content of the voiced response. It has been discovered that, for one important class of itemized expressions, the number of items voiced in a group in a voiced response can be counted by counting the number of higher amplitude segments H that are typically followed by relatively long lower amplitude segments L. Of course, other types of itemized expressions may require other selection criteria.

This approach can be used to count the number of spoken itemized expressions such as (1) numbers in a zip code or telephone number or (2) letters in a spelled name or (3) a mix of numbers, letters and other words such as "P.O. Box 23." Also, this approach can be used to count the number of longer elements voiced in a group or list, such as a list of items being ordered.

Though the following discussion of the character counting routine of FIGS. 2a and 2b focuses on the recognition of characters, this invention also finds application in counting longer elements voiced in a list or group.

Before discussing the character counting routine of FIGS. 2a and 2b, reference should be made to FIG. 3, which flow charts the interrupt service routine that increments three timers LTIMER, HTIMER and CTIMER. This interrupt service routine is executed periodically, for example, once every millisecond. The routine increments CTIMER by one and then tests the signal MV. If MV is in the logic high state, HTIMER is incremented. Otherwise LTIMER is incremented before the routine returns from the interrupt back to the character counting routine. The interrupt service routine of FIG. 3 causes LTIMER, HTIMER and CTIMER to operate as timers of the low amplitude segments, high amplitude segments, and total cycle time, respectively.

Turning now to FIGS. 2a and 2b, the character counting routine of FIG. 1 begins by checking the state of the on/off switch generated by the system 10. The routine waits until the on/off switch is turned on, and then the variables COUNTER, FLAG 1 and CTT are reset to zero. Next, the variables LTIMER, HTIMER, CTIMER, HT, LT, CT are all reset to zero. The routine then waits in block 30 until the signal MV enters the high state, indicative of a higher amplitude segment. Once this occurs the routine then waits in blocks 32 and 34 until MV transitions from the low state to the high state or LTIMER exceeds one second. When either condition is satisfied, LTIMER is stored as LT, HTIMER is stored as HT and CTIMER is stored as CT.

At this point, the routine has measured the duration of a higher amplitude segment with HTIMER and stored this duration in the variable HT, and has measured the duration of a following lower amplitude segment with LTIMER and stored this duration in the variable LT. CTIMER at this point contains a number indicative of the duration of the cycle (made up of one higher amplitude segment and the following lower amplitude segment), and the value of CTIMER has been stored in CT.

Once an individual cycle has been completed and LT, HT and CT have been stored in block 36, the routine then checks to determine whether HT is within a range of values indicative of an anticipated expression. For example, this range is preferably between 20 milliseconds and 250 milliseconds when the anticipated expression is a single digit or character. If HT is only 10 milliseconds, this indicates that the multivibrator 26 was triggered only once and that the corresponding higher amplitude segment was probably due to a noise spike. Similarly, if HT is greater than 250 milliseconds, this indicates that the higher amplitude segment corresponding to HT has a duration substantially longer than that anticipated for a single digit character. In either event, HT is not considered to be indicative of a digit or a character and block 38 branches to node B. If HT is within the anticipated range characteristic of a character, block 38 branches to node A. Of course, the particular range of values used as indicative of an expression can range widely, depending on the type of expression that is of interest.

As shown in FIG. 2b, the routine proceeds from node A to check the ratio of HT divided by LT in comparison with the threshold THRESH1. As pointed out above, digits or characters, when voiced by the average person, are followed by a period of relative silence which is typically longer than the duration of the voiced character. Thus, characters will typically have a ratio HT/LT less than 1, while sentence phrases and other continuous speech will have a ratio HT/LT substantially greater than 1. In this example, THRESH1 is set equal to 1, and block 40 classifies the cycle as having a ratio either indicative of a digit or character or not. Of course, the value of THRESH1 can vary widely, depending on the type of expression that is of interest. For example, THRESH1 can be set as high as 20 or as low as 1 or 2.

If the ratio HT/LT is indicative of a digit or character, the variable FLAG 1 is set equal to 1 in block 41 to indicate that an itemized expression (in this case a digit or character) has been detected, the variable COUNTER is incremented in block 42 and CT is added to the variable CTT in block 44. In this embodiment, COUNTER contains a number indicative of the number of digits or characters counted by the routine. CTT is a variable indicative of the total duration of each of the individual cycles classified as containing a voiced digit or character. In this example, both the absolute length of HT and the ratio HT/LT are used as two separate tests of whether a digit or character is present. Either test can be used above to discriminate digits or characters, but it is preferred to use both tests together for best results.

Once COUNTER and CTT have been incremented, COUNTER is then compared with THRESH2. THRESH2 is a threshold indicative of the number of digits or characters anticipated in the response. For example, if the system 10 has requested a zip code, THRESH2 may be set equal to 6. Block 46 branches to node C to continue counting additional characters if COUNTER is less than THRESH2.

Otherwise, block 46 branches to block 48, in which CTT is compared with THRESH3. THRESH3 is a variable indicative of the anticipated maximum duration of all of the character cycles counted by the routine. In this example, THRESH3 can be set at approximately 120 milliseconds times THRESH2, i.e., a maximum cycle time for each character of 120 milliseconds. If CTT is less than THRESH3, indicating that the expected number of digits or characters were spoken within the time period defined by THRESH3, then the variable FLAG 2 is turned on and the amount stored in the COUNTER is sent to the system 10. Alternately, if CTT is greater than or equal to THRESH3, then the variable FLAG 2 is turned off and the contents of the COUNTER are sent to system 10. The routine then sets FLAG 1 to zero to indicate the termination of itemized expressions and then returns to node D to continue searching for additional characters as long as the on/off switch is turned on by the system 10.

If HT is outside the anticipated range indicative of a character in block 38, or if the ratio HT/LT is greater than or equal to THRESH1 in block 40, the routine then branches directly to block 48 to compare CTT with THRESH3.

The routine of FIGS. 2a and 2b classifies a higher amplitude segment as a voiced expression only if (1) the higher amplitude segment has a duration indicative of an expression and (2) the ratio between the duration of the higher amplitude segment and the duration of the following lower amplitude segment is also indicative of an expression. Operation of the counter is terminated (1) when COUNTER reaches the anticipated maximum number of expressions (THRESH2) or (2) when the total duration of all counted expression cycles exceeds THRESH3. FLAG 1 indicates transitions between continuous speech and itemized expressions. In particular, FLAG 1 changes state at both the start and stop of a string of spoken itemized expressions.

The routine of FIGS. 2a and 2b counts the higher amplitude segments that meet the test for an expression to determine the nature of the response and when the response has been completed. The routine provides the system 10 with a count of the number of expressions detected. This can be used by the system 10 to control branching of the programmed conversation. For example, if the system 10 requests a zip code and then turns the on/off switch on for the entirety of the respondent's answer, the variable COUNTER supplied by the character counting routine will indicate the number of characters spoken by the respondent, without specifically recognizing the identity of any individual expression.

In this example, if the character counting routine counts 5 digits, the system 10 can be programmed to go on to a next question. If fewer than 5 digits are counted, the system 10 can be programmed to request the zip code again. As another example, if the system 10 is programmed to request the respondent's telephone number, and the character counting routine counts 6 to 8 digits, the system 10 can be programmed to request an area code. If the character counting routine counts 9 to 11 characters, the system 10 can be programmed to continue. If the character counting routine counts fewer than 7 characters, the system 10 can be programmed to repeat its request for the respondent's telephone number.

It should be understood that the character counting routine performs a useful function even if the count of characters is not completely accurate. In the foregoing example, if the character counting routine counts fewer than 5 characters, it is probable that the telephone number was not given and the prompt should be repeated. If the routine counts between 6 and 8 characters, it is probable that the telephone number was given without an area code, and that the area code should be requested as the next prompt to be sure. If the character counting routine counts between 9 and 13 characters, the entire telephone number with area code was probably voiced. Finally, if the character counting routine counts more than twelve characters, there may be a high probability that the respondent was not responding correctly to the question.

The relative length of the lower amplitude periods can be indicative of an answer or a non-answer. For example, when asking for a phone number the speaker's response will include an appropriate number of characters if the speaker has answered the question. However, if the speaker answers "Which phone number do you want?", the number of spoken itemized expressions would be too small to indicate a completed phone number and the duration too long for a single digit expression. The response could then be identified as a non-character response. "Do you want" could be misinterpreted as a string of three characters only if these words were spoken discretely rather than being slurred as is much more typical. Thus, though the preferred embodiment described above counts expressions, this invention can also be used to distinguish speech phrases from other utterances, or to detect the end of phrases or sentences. Such detection would be based on a period of lower amplitude after a relatively long period of voice at a higher amplitude, i.e., a time ratio of higher amplitude to lower amplitude which was very high (10 or more).

Furthermore, this invention can be implemented in systems which dynamically respond to the pattern of the speaker's response. If the name WASHINGTON is being spelled, the pace of the characters being voiced will often be relatively constant for any individual speaker. Thus, characters can be detected based on a pace as well as or instead of on a fixed ratio of the duration of higher and lower amplitude segments. In this context, pace is a dynamically established ratio of higher amplitude segment duration to lower amplitude segment duration computed based on the speaking of several characters.

When this approach is taken it may be important to note that there may be longer duration lower amplitude periods from time to time, such as is characteristic of the break between the area code and the prefix in a ten digit telephone number. This alternative is anticipated and therefore can be incorporated into the discrimination program. For example, for a string of digits that make up a social security number, the ratio of duration of higher amplitude to lower amplitude segments can vary without a significant variation in the duration of the higher amplitude segments. Such a variation can be taken as an indication of a change in the grouping of numbers. The pattern of digits in a social security number is 3, 2, 4. Thus, if the last group was found to have only three detected characters, the system 10 could be programmed to request that the last four digits of the social security number be repeated.

The functions described above can be modified and adapted for individual applications, and they can be implemented with a wide range of hardware, including many commonly available computer systems. The expression recognition routine can be implemented by a separate computer as shown in FIG. 1, or it can be integrated into the system 10. Additionally, higher and lower amplitude segments may be distinguished from one another using other criteria, including slope, amplitude excursion, or presence of selected frequency signals. Relative measures of duration may be used instead of absolute measures, and analog measuring techniques such as capacitor charging techniques may be substituted for the digital techniques discussed above.

Second Preferred Embodiment

FIG. 5 shows a block diagram of a programmed conversation recording system 10' and categorization system 20' which are in many ways similar to the systems 10, 20 described above. Corresponding elements between the two embodiments are indicated by the use of the same reference numeral, primed in the case of the embodiment of FIGS. 5-7. Any elements of the systems 10', 20' not discussed in detail are adequately described above in conjunction with FIGS. 1-4.

The categorization system 20' receives an audio input on line 14' from the programmed conversation recording system 10'. This audio input comprises the responses of the user, and is applied to an automatic gain control circuit 22'. The output of the automatic gain control circuit 22' is applied in parallel to two comparators 24a', 24b'. Each of the comparators 24a', 24b' receives a respective reference voltage $V_{REF1}$, $V_{REF2}$.

Each of the comparators 24a', 24b' generates an output signal when the signal from the automatic gain control circuit 22' exceeds the respective reference voltage $V_{REF1}$, $V_{REF2}$. These comparator output signals are applied to two multivibrators 26a', 26b', respectfully. The multivibrator 26a' corresponds generally to the multivibrator 26 of FIG. 1, and the multivibrator 26a' generates a binary output signal MV1. The output signal MV1 is placed in a logic high state whenever the multivibrator 26a' is triggered by the comparator 24a', and remains in the high state for a brief period of time such as ten milliseconds, unless retriggered while in the high state.

The output of the comparator 24b' is applied to the multivibrator 26b', which generates an output signal MV2. The cycle time of the multivibrator 26b' is preferably shorter than that of the multivibrator 26a'. For example, a cycle time of two milliseconds can be used for the multivibrator 26b'. This is possible because the output signal MV2 is sampled only when the output signal MV1 is high. Thus, spurious noise can be filtered out by the relatively longer cycle time of the multivibrator MV1. As explained below, the output signal MV2 is used to recognize accented syllables, which can occur relatively quickly compared with an entire expression. As an alternative, the cycle times of the multivibrators 26b', 26a' may be set at 10 and 20-50 milliseconds, respectively.

$V_{REF1}$ is set somewhat lower than $V_{REF}$ of the first embodiment and is set at the Voice threshold level to recognize the user's voice, regardless of what is being said. Similar reference voltages are commonly used in state of the art voice detection circuits. $V_{REF2}$ is set to a value about midway between the peak level of accented syllables and the peak level of non-accented syllables to recognize accented syllables. For example, $V_{REF2}$ should be set such that when the number "22" is voiced $V_{REF2}$ is exceeded twice, once at the beginning of "20" and a second time at the beginning of "2". $V_{REF1}$ on the other hand would be exceeded only once when the number "22" is voiced.

The output signals MV1 and MV2 are applied to an expression counting routine included in the computer 28'. This routine is flowcharted in FIGS. 6a and 6b. The routine begins by monitoring an on/off switch signal provided by the system 10'. The routine simply loops until the on/off switch signal is turned on. Then two variables COUNTER1 and CTT are reset to zero and then LTIMER, HTIMER, CTIMER, HT LT, CT and COUNTER2 are reset to zero. COUNTER1 is used to count the itemized expressions detected by the routine and COUNTER2 is used to count the number of accented syllables.

The routine then loops at decision block 30' until the output signal MV1 enters the high state. Once MV1 enters the high state (indicative of speech) the routine then checks MV2 in decision block 31a' to determine if MV2 is in the high state. If so, COUNTER2 is incremented and the routine then loops in decision block 31b' until MV2 leaves the high state. Control is returned to decision block 31a' where MV2 is again checked. Whenever MV2 is not in the high state MV1 is again checked and control is returned to decision block 31a' when MV1 is in the high state.

In this way COUNTER2 is incremented for each accented syllable during the time that MV1 is in the high state. When MV1 enters the low state (indicative of a pause or termination in speech) COUNTER2 is sent to system 10' at block 31c'.

Thus, when termination of a word or phrase is detected by a change of state of MV1 from high to low, the number of accented syllables detected in the word or phrase is sent to the system 10'. The system 10' can compare the number of recognized accented syllables with the anticipated range of accented syllables for various anticipated responses.

The remainder of the routine of FIGS. 6a and 6b corresponds to the routine of FIGS. 2a and 2b described above. Again, corresponding reference numerals have been used to indicate corresponding portions of the two flowcharts, and the description set out above applies equally to the portion of the flowchart of FIGS. 6a and 6b that includes the elements 32'-48' as it does to the corresponding portions of FIGS. 2a-2b.

FIG. 7 provides a flowchart of the interrupt service routine of FIG. 5. This routine is quite similar to the routine of FIG. 3, and the description of FIG. 3 should be referenced for an understanding of the operation of the routine of FIG. 7.

FIGS. 8a-8c clarify the operation of the systems 10', 20'. FIGS. 8a, b and c correspond to FIGS. 4a, b and c described above, except that in each case $V_{REF2}$ has been indicated and a waveform for the corresponding MV2 has been shown. Note that in FIG. 8a (which illustrates waveforms representative of the positive side of the envelope of a series of spoken itemized expressions such as characters), the characters are relatively brief in duration and the state transitions of MV2 closely track the state transitions of MV1. Thus, MV2 indicates that there is only a single accented syllable in each of the four illustrated expressions.

FIG. 8b shows the positive side of the envelope for numbers voiced as two number sets (such as "25"). As noted above, these expressions are longer in duration, and this longer duration is indicated by MV1. Additionally, MV2 indicates that some of the expressions include multiple accented syllables. Note for example the first expression, during which time MV1 makes a single cycle from low to high to low, whereas MV2 indicates two separate accented syllables by entering the high state at two discrete times.

FIG. 8c shows a waveform typical of continuous voice such as is encountered in a spoken sentence that lacks itemized expressions. Note that the duration of the sentence is longer than before, as indicated by the length of time MV1 is in the high state, and that the sentence includes a larger number of accented syllables (three in the case of the first sentence shown in FIG. 8c) as indicated by MV2.

FIGS. 8a-8c illustrate the manner in which MV2 allows the number of accented syllables to be counted, and the manner in which such a count of accented syllables may aid in the classification of a speech segment as an itemized expression or as continuous speech.

As pointed out above, COUNTER2 of FIG. 6a provides the system 10' with a count of the number of accented syllables within a higher amplitude segment of speech. This information allows the system 10' to gain further accuracy and selectivity in classifying the speech segment. The information provided by COUNTER2 is especially useful when classifying longer multiword expressions, particularly when HT/LT is substantially greater than one.

For example, the system 10' may be programmed to differentiate "P.O. Box 123" from "123 Boxelder". The advantage of differentiating these two responses is that in the former case the system does not have to ask the user how the street name is spelled. The system 10' would analyze "P.O. Box 123" as having six syllables, the first three being in a single leading word. The system 10' would analyze "123 Boxelder" as having six syllables, with three syllables in the last word. This second pattern is indicative that a street name has been given, and the system 10' can be programmed to request the user to spell the name.

Another example would be in recognizing expressions of double numbers, such as "25". The system 10' would recognize "25" as a double number because there are two accented syllables within a single expression. The system 10' would not count "7" as a double number even though it has two syllables, because only one of the two syllables is accented. These are two examples of the manner in which the double threshold approach of the system 10', 20' provides further information that allows more accurate classification of expressions and continuous speech in certain circumstances, as compared with the system 10 of FIG. 1.

Although not described in detail or illustrated in the drawings, the time gaps between adjacent accented syllables, the length of accented syllables and the time relationships of high to low transitions of MV2 can be further refined to provide even more information useful in classifying the user response. For example, the variables HT and LT can be developed separately for both MV1 and MV2 to allow the same sorts of distinctions that have been described above in conjunction with MV to be applied to MV2 to enhance classification accuracy.

Of course, it should be understood that a wide range of changes and modifications can be made to the preferred embodiments described above. For example, the present invention can readily be adapted for use with systems such as security systems that do not conduct programmed conversations, or that do not present outgoing messages. Additionally, times for the total cycle time and either the higher or lower segment time may be used instead of HTIMER and LTIMER. The entire process may be performed digitally, eliminating separate components such as automatic gain controls, multivibrators and comparators. It is therefore intended that the foregoing detailed description be regarded as illustrative rather than limiting, and that it be understood that it is the following claims, including all equivalents, which are intended to define the scope of this invention.

I claim:

1. A method to recognize a spoken itemized expression in a speech segment, comprising the following steps:
   a) identifying at least one higher amplitude segment in the speech segment;
   b) identifying at least one subsequent adjacent lower amplitude segment in the speech segment;
   c) measuring the duration of the higher amplitude segment and the lower amplitude segment;
   d) recognizing the higher amplitude as a spoken itemized expression when the duration of the higher amplitude segment measured in step (c) is less than approximately 20 times the duration of the lower amplitude segment measured in step (d); and
   e) recognizing an accented portion of the higher amplitude segment.

2. The method of claim 1 wherein step (d) comprises the following steps:
   determining a ratio indicative of comparative duration of the higher and lower amplitude segments; and
   recognizing the higher amplitude segment as a spoken itemized expression when the ratio is within a selected range of values.

3. The method of claim 1 wherein the spoken itemized expression comprises a character.

4. A method to recognize a spoken itemized expression comprising the following steps:
   a) identifying at least segment indicative of speech followed by an adjacent segment indicative of a pause in said voiced speech and measuring a duration of the speech segment; and
   b) recognizing the speech segment as a spoken itemized expression when the measured duration of the speech segment is within a selected range of values; and
   c) recognizing an accented portion of the speech segment.

5. The method of claim 4 wherein the selected range of values is greater than 10 milliseconds and less than about 250 milliseconds.

6. The method of claim 4 wherein the selected range of values includes values less than a specified maximum value.

7. A method to recognize a spoken itemized expression in a speech segment, comprising the following steps:
   a) identifying at least one higher amplitude segment in the speech segment;
   b) identifying at least one subsequent adjacent lower amplitude segment in the speech segment;
   c) measuring the duration of the higher amplitude segment and the lower amplitude segment;
   d) determining a ratio initiative of comparative duration of the higher and lower amplitude segments;
   e) recognizing the higher amplitude segment as a spoken itemized expression when the ratio is within a selected range of values; and
   f) recognizing an accented portion of the higher amplitude segment.

8. The method of claim 1 or 4 or 7 wherein the itemized expression is selected from the group consisting of individual words, digits, and characters.

9. The method of claim 1 or 4 or 7 wherein the higher and lower amplitude segments comprise a plurality of segments, and wherein the method further comprises the step of counting each higher amplitude segment recognized as a spoken itemized expression.

10. The method of claims 1 or 4 or 7 further comprising the step of signalling in response to recognizing a transition between continuous speech and a spoken itemized expression.

11. The method of claim 1 or 4 or 7 wherein the accented portion recognizing step comprises the step of counting the accented portions of the higher amplitude segment.

12. The method of claim 1 or 4 or 7 wherein the accented portion recognizing step comprises the steps of comparing the higher amplitude segment with a reference amplitude, recognizing the accented portion of the higher amplitude segment when the higher amplitude segment exceeds the reference amplitude, and counting the recognized accented portion.

13. A speech categorization system for counting portions of a voice message comprising at least one higher amplitude segment and at least one lower amplitude segment, at least some of said higher amplitude segments indicative of voiced speech, at least some of said lower amplitude segments indicative of periods of non-speech between adjacent voiced speech, said system comprising:
   a timer operative to generate first and second measured durations, wherein the first measured durations vary as a function of duration of selected higher amplitude segments, and wherein the second measured durations vary as a function of selected lower amplitude segments;
   means for recognizing and counting an accented portion of at least one of the higher amplitude segments;
   means for classifying a higher amplitude segment in a first category when the first and second measured durations corresponding to the higher amplitude segment and an adjacent and subsequent lower amplitude segment satisfy a classification test; and
   a counter operative to count the number of higher amplitude segments classified in the first category.

14. The invention of claim 13 wherein the classifying means comprises:
   means for taking a ratio of the first and second durations; and
   means for comparing the ratio to a selected value and for classifying the higher amplitude segment in the first category when the ratio has a selected relationship to the selected value.

15. The invention of claim 13 wherein the recognizing means comprises:
   a comparator that compares the higher amplitude segment with a reference amplitude; and
   means for recognizing the accented portion of the higher amplitude segment when the higher amplitude segment exceeds the reference amplitude.

16. A speech categorization system for categorizing portions of a voice message comprising at least one higher amplitude segment and at least one lower amplitude segment,.at least some of said higher amplitude segments indicative of voiced speech, at least some of said lower amplitude segments indicative of periods of non-speech between adjacent voiced speech, said system comprising:
   a timer operative to generate first and second measured durations, wherein the first measured durations vary as a function of duration of selected higher amplitude segments, and wherein the second measured durations vary as a function of selected lower amplitude segments;

means for recognizing an accented portion of at least one of the higher amplitude segments; and means for classifying a higher amplitude segment as a spoken itemized expression based on when the first and second measured durations for the higher amplitude segment and the adjacent subsequent lower amplitude segment satisfy a classification test.

17. The invention of claim 16 wherein the classifying means comprises:

means for taking a ratio of the first and second durations; and means for comparing the ratio to a selected value and for classifying the higher amplitude segment as a spoken itemized expression when the ratio has a selected relationship to the selected value.

18. The invention of claim 16 wherein the classifying means comprises:

means for comparing the first and second durations and for classifying the higher amplitude segment as a spoken itemized expression when the first duration is less than the second duration.

19. The invention of claim 16 wherein the recognizing means comprises:

a comparator that compares the higher amplitude segment with a reference amplitude; and means for recognizing the accented portion of the higher amplitude segment when the higher amplitude segment exceeds the reference amplitude.

20. A speech categorization system for categorizing portions of a voice message comprising at least one higher amplitude segment and at least one lower amplitude segment, at least some of said higher amplitude segments indicative of voiced speech, at least some of said lower amplitude segments indicative of periods of non-speech between adjacent voiced speech, said system comprising:

means for developing a classification parameter indicative of comparative duration of at least some of the higher amplitude segments with respect to adjacent lower amplitude segments;

means for classifying the higher amplitude segments into at least two categories, wherein one of said categories is indicative of a spoken itemized expression, said classifying means applying at least one classification test, said test operative to place one of the higher amplitude segments in a first category when the respective classification parameter is greater than a threshold value and to place said one of the higher amplitude segments in a second category when the respective classification parameter is less than the threshold value;

means for recognizing and counting an accented portion of at least one of the higher amplitude segments; and a counter that compares the higher amplitude segments in one of the two categories to characterize the voice message.

21. The invention of claim 20 wherein each of the classification parameters is indicative of the ratio between the duration of one of the higher amplitude segments and the duration of an adjacent one of the lower amplitude segments.

22. The invention of claim 20 wherein the developing means comprises:

a first timer operative to time duration of at least selected higher amplitude segments to generate a first measured duration;

a second timer operative to time duration of at least selected lower amplitude segments adjacent to said selected higher amplitude segments to generate a second measured duration; and means for taking a ratio of one of the first and second measured durations to the other, wherein said classification parameter varies as a function of said ratio.

23. The invention of claim 20 wherein said one of the two categories is indicative of a spoken itemized expression, and wherein the invention further comprises:

means for classifying one of the higher amplitude segments in the other of the two categories when the higher amplitude segment has a duration greater than a selected value.

24. The invention of claim 20 wherein the spoken itemized expression is a voiced character.

25. The invention of claim 20 wherein the recognizing means comprises:

a comparator that compares the higher amplitude segment with a reference amplitude; and means for recognizing the accented portion of the higher amplitude segment when the higher amplitude segment exceeds the reference amplitude.

* * * * *